(12) United States Patent
Lei et al.

(10) Patent No.: US 7,716,383 B2
(45) Date of Patent: May 11, 2010

(54) FLASH-INTERFACED FINGERPRINT SENSOR

(75) Inventors: Xia Lei, Shenzhen (CN); Christopher Thomas, San Diego, CA (US); Jun Ye, Shenzhen (CN)

(73) Assignee: Symwave, Inc., Laguna Niguel, CA (US)

( * ) Notice: Subject to any disclaimer, the term of this patent is extended or adjusted under 35 U.S.C. 154(b) by 866 days.

(21) Appl. No.: 11/236,004

(22) Filed: Sep. 27, 2005

(65) Prior Publication Data

US 2006/0069826 A1    Mar. 30, 2006

Related U.S. Application Data

(60) Provisional application No. 60/613,842, filed on Sep. 27, 2004.

(51) Int. Cl.
*G06F 3/00* (2006.01)
*G06F 13/00* (2006.01)

(52) U.S. Cl. .................. 710/8; 710/5; 710/36

(58) Field of Classification Search ........................ None
See application file for complete search history.

(56) References Cited

U.S. PATENT DOCUMENTS

2001/0052541 A1* 12/2001 Kang et al. .................. 235/379
2005/0097338 A1* 5/2005 Lee ............................. 713/186

* cited by examiner

*Primary Examiner*—Tariq R. Hafiz
*Assistant Examiner*—Scott Sun
(74) *Attorney, Agent, or Firm*—Steins & Associates, P.C.

(57) ABSTRACT

A Flash-interfaced Fingerprint Sensor is disclosed. The sensor device interfaces directly with a flash memory interface chip. The flash memory interface chip incorporates the system for interfacing with flash memory devices, a fingerprint sensor/detector system, and an encryption subsystem for encrypting data being passed to and from the flash memory devices and the host computing device. The device further employs an advanced encryption approach that entails fingerprint decryption and verification on the host computer rather than on the portable memory apparatus. Once verification at the host computer is complete, memory and host functionality is enabled.

15 Claims, 9 Drawing Sheets

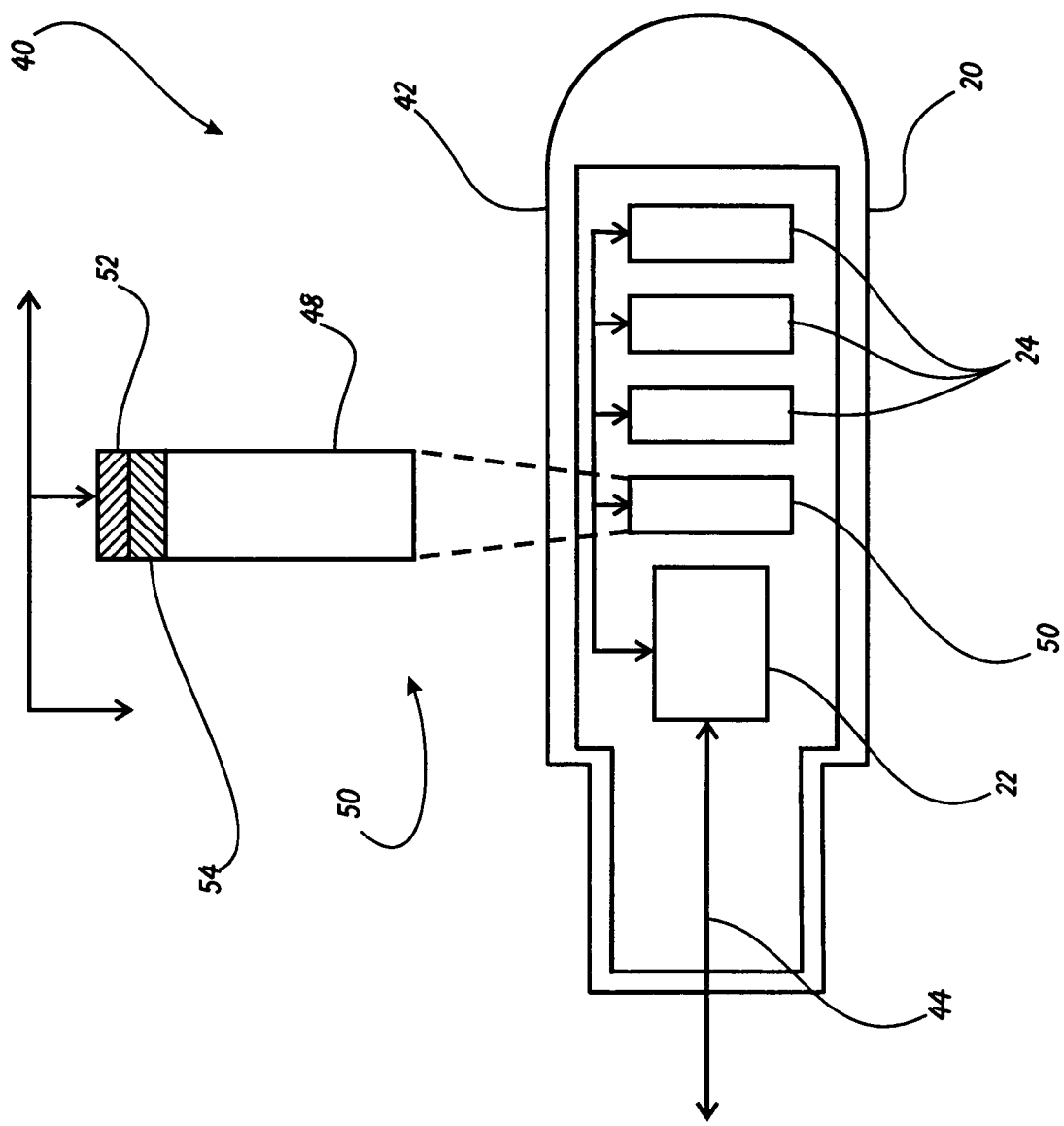
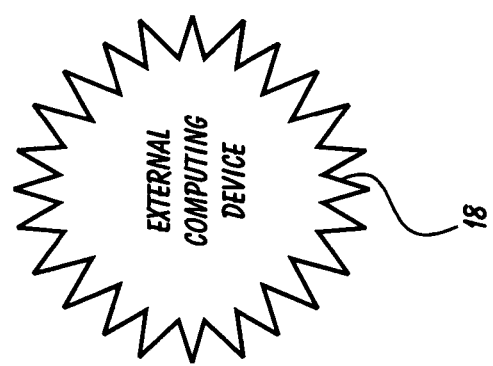
FIGURE 7

FLASH-INTERFACED FINGERPRINT SENSOR

This application is filed within one year of, and claims priority to Provisional Application Ser. No. 60/613,842, filed Sep. 27, 2004.

BACKGROUND OF THE INVENTION

1. Field of the Invention

This invention relates generally to fingerprint sensors and related devices and, more specifically, to a Flash-interfaced Fingerprint Sensor.

2. Description of Related Art

Miniature portable electronic storage devices have advanced substantially in recent years. An extremely popular version is the USB flash drive. FIG. 1 is an exploded perspective view of a conventional USB flash drive 10. The Conventional USB Flash Drive 10, which many times is configured to be attached to a person's keychain, is roughly the size of a package of gum and is defined by a Housing 12 from which a USB Plug 14 extends, with a Cap 16 typically included to protect the Plug 14. This Conventional Drive 10 is used generally to permit the easy storing and transfer of electronic files. The user simply inserts the USB Plug 14 into the appropriate receptacle on a host computer and the computer's operating system generally will discover the new addition and will then allow the user to access the memory on the Flash Drive 10 just as the user would access any other storage device associated with the computer. If we now turn to FIG. 2, we can examine the main components of the Conventional Flash Drive 10.

FIG. 2 is a block diagram of the conventional USB flash drive of FIG. 1. Within the Housing 12 is a Circuit Substrate 20, which is typically a conventional PC board. On the Circuit Substrate 20 a plurality of Flash Memory Devices 24 are attached and electrically connected. A Flash Interface Device 22 controls access to the Memory Devices 24 by the External Computing Device 18 such as a host personal computer.

The Flash Memory Devices 24 are available in different sizes, and furthermore the number of Devices 24 included in the Flash Drive 10 can be varied in order to provide the amount of memory that is desired by the manufacturer. Turning to FIG. 3, we can examine how the Flash Drive 10 operates.

FIG. 3 depicts the functional orientation of the drive of FIGS. 1 and 2 relative to a host computing device. As shown here, there are four Flash Memory Devices 24A, 24B, 24C and 24D. Each of these Devices 24 communicates directly with the USB Flash Interface Device 22. The Interface Device 22 is designed to control access to the Memory Devices 24 from any outside system. The Device 22 may include the ability to encrypt and/or password protect access to the Memory Devices 24. The USB Flash Interface Device 22 then communicates with the USB Host Interface Device 26 that is contained within the External Computing Device 18. Within the Computing Device 18 there will also be Driver Software Applications 28 that enable the functionality of the USB Flash Drive 10, including some encryption and/or password protection capabilities associated with the USB Flash Interface Device 22.

In an effort to further secure the data contained within the Conventional USB Flash Drive, one manufacturer incorporated a Fingerprint Sensor Device 32. FIG. 4 depicts a system incorporating this device. FIG. 4 is a block diagram of a conventional fingerprint-sensing USB flash drive 30. The Conventional Fingerprint Sensing USB Flash Drive 30 comprises a Housing and USB Flash Interface, but in this case the Flash Interface Device 23 has specialized capabilities in order to enable it to interface with the Microcontroller Fingerprint Sensor Device 32 that is used in this Drive 30. Furthermore, because the Fingerprint Sensor Device 32 and Specialized Flash Interface Device 23 would otherwise be an incompatible with the conventional circuit substrate, a Specialized Circuit Substrate 21 must be used for this Fingerprint Sensing USB Flash Drive 30.

The Microcontroller Fingerprint Sensor Device 32 has two main parts; the Fingerprint Sensor System 34 and the Microcontroller Interface 36. If we now turn to FIG. 5, we can discuss the operation of this Drive 30.

FIG. 5 depicts the functional orientation of the drive of FIG. 4 relative to a host computing device. As shown here, each of the Flash Memory Devices 24, rather than communicating directly with the USB Flash Interface Device 23, instead communicate directly with the Microcontroller Fingerprint Sensor Device 32. Specifically, the Microcontroller Interface portion 36 of the Device 32 operates to accept fingerprints that are sensed by the Sensor System 34 and then determine whether or not access will be granted to the Devices 24 via the USB Flash Interface 23. If access is granted, then the USB Host Interface 26 will be allowed access and the Driver Applications 28 will also be allowed to access to the Flash Memory Devices 24.

The problem with this prior system is that it is so customized in its design, that beyond the conventional flash memory devices, virtually every component within the drive is custom. As a result, this device can never be cost competitive with a non-fingerprint sensing USB drive and furthermore is unlikely to be economically feasible. What is needed is a low-cost way of converting conventional USB flash drive architecture to add fingerprint sensing capability.

SUMMARY OF THE INVENTION

In light of the aforementioned problems associated with the prior devices and methods, it is an object of the present invention to provide a Flash-interfaced Fingerprint Sensor. The sensor should interface directly with a flash memory interface chip. The flash memory interface chip should incorporate the system for interfacing with flash memory devices, a fingerprint sensor/detector system, and an encryption subsystem for encrypting data being passed to and from the flash memory devices and the host computing device. The device should further employ an advanced encryption approach that entails fingerprint decryption and verification on the host computer rather than on the portable memory apparatus. Once verification at the host computer is complete, memory and host functionality should be enabled.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIG. 7 is a block diagram of the USB drive of FIG. 6;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a Flash-interfaced Fingerprint Sensor.

Figure 6:
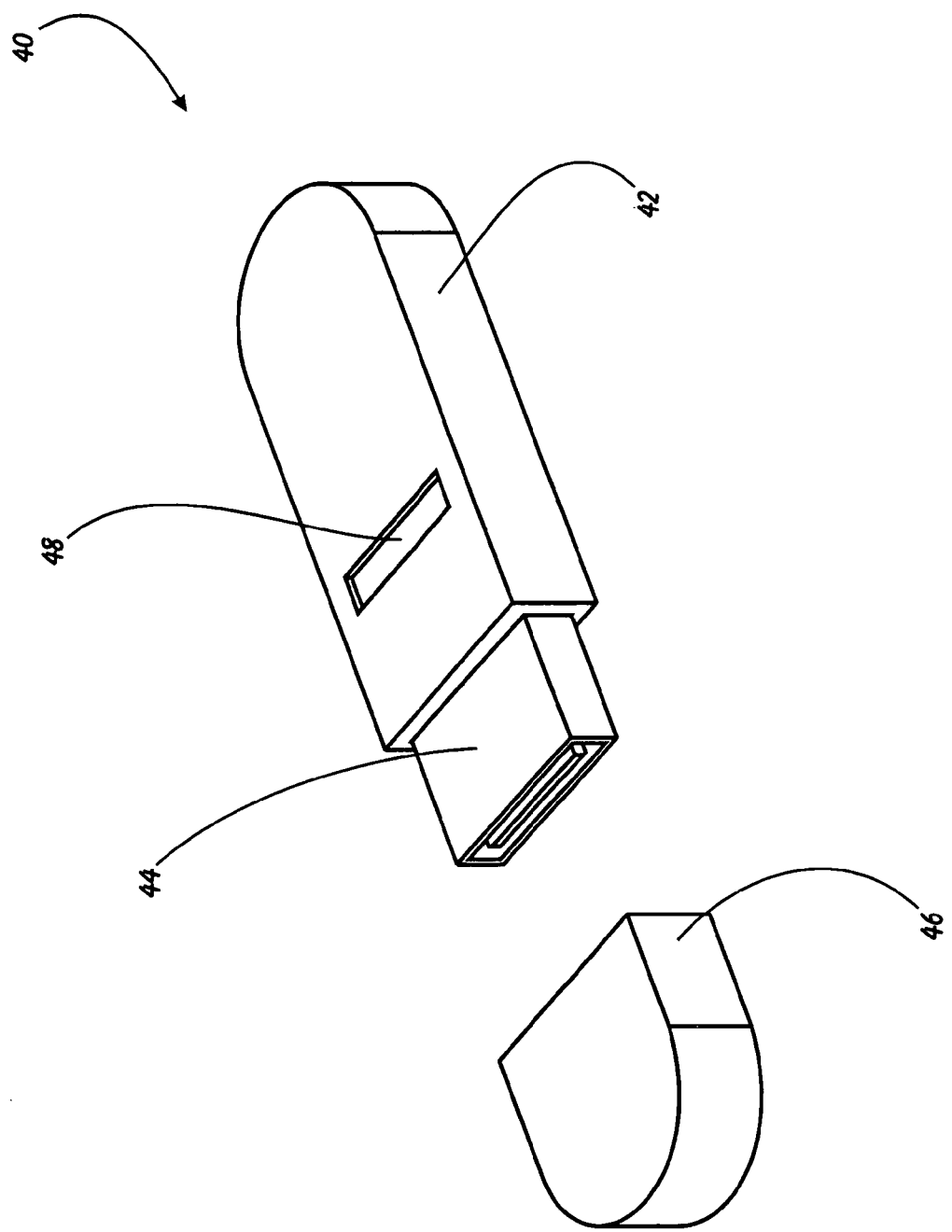
FIG. 6 is an exploded perspective view of a USB flash drive incorporating a preferred embodiment of the flash-interfaced fingerprint sensor of the present invention.

The present invention can best be understood by initial consideration of FIG. 6. FIG. 6 is an exploded perspective view of a USB flash drive incorporating a preferred embodiment of the flash-interfaced fingerprint sensor of the present invention. The USB Flash Drive Having a Flash Interfaced Fingerprint Sensor 40 comprises a Housing 42, a USB Plug 44 and a Cap 46 therefor, and a Flash Fingerprint Sensor 48 which is exposed so that the user can swipe his or her finger or thumb across its window. As you can see, the dimensions and shape of this USB Flash Drive 40 are identical to a conventional drive, the only difference being that there is a Fingerprint Sensor 48 disposed on the outer surface. If we now turn to FIG. 7, we can examine how this system operates.

Figure 1:
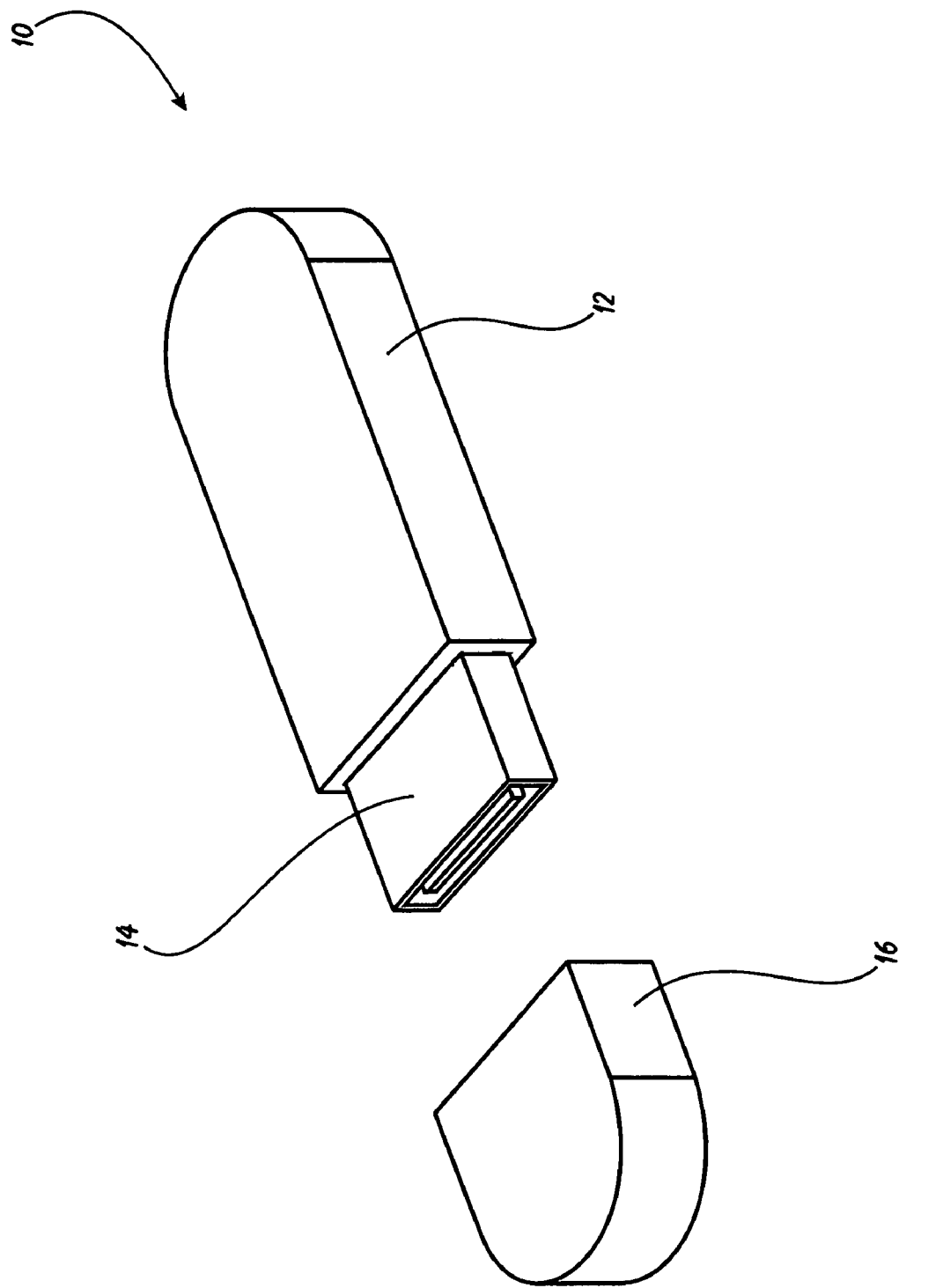
FIG. 1 is an exploded perspective view of a conventional USB flash drive.
Figure 2:
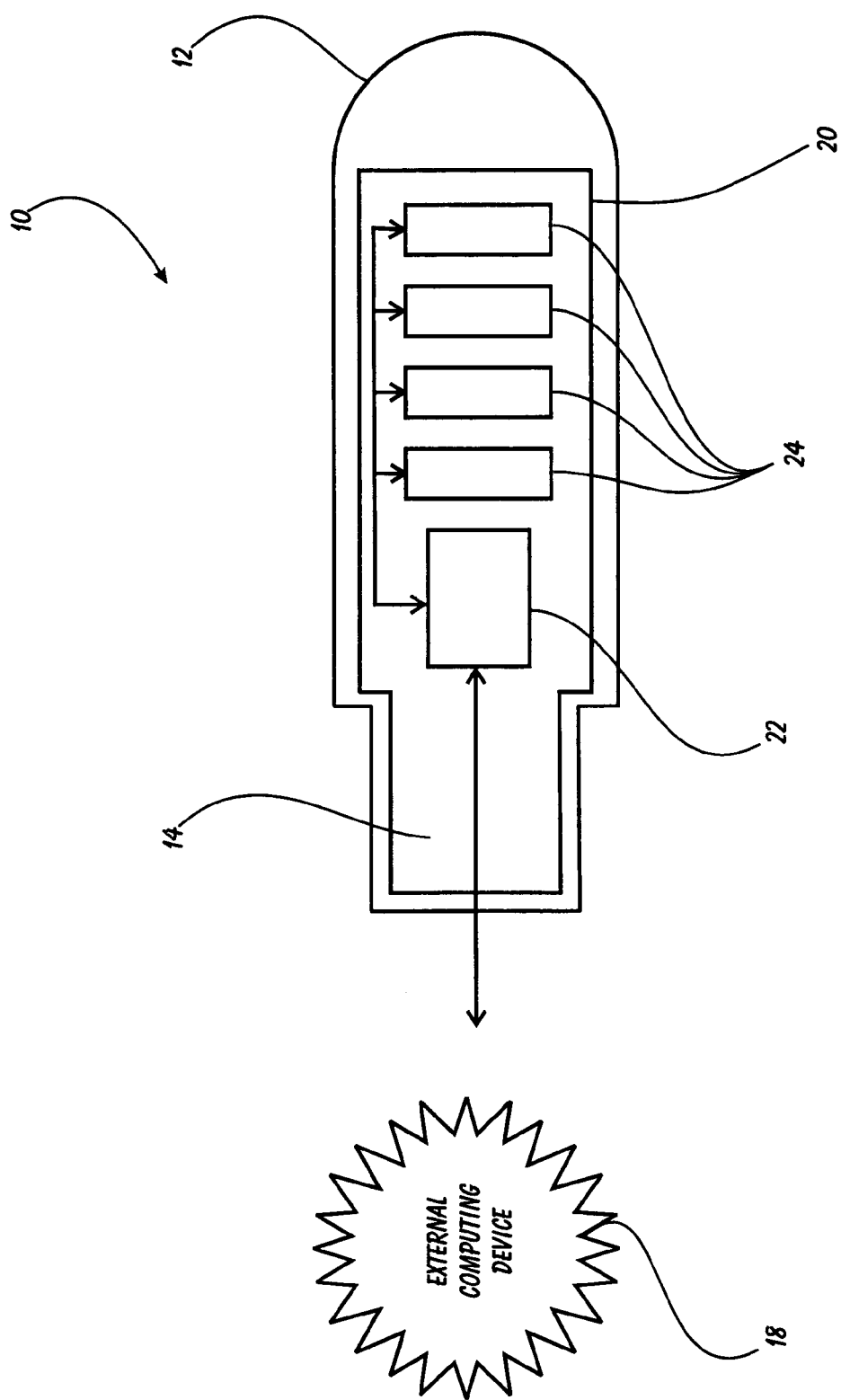
FIG. 2 is a block diagram of the conventional USB flash drive of FIG. 1.
Figure 3:
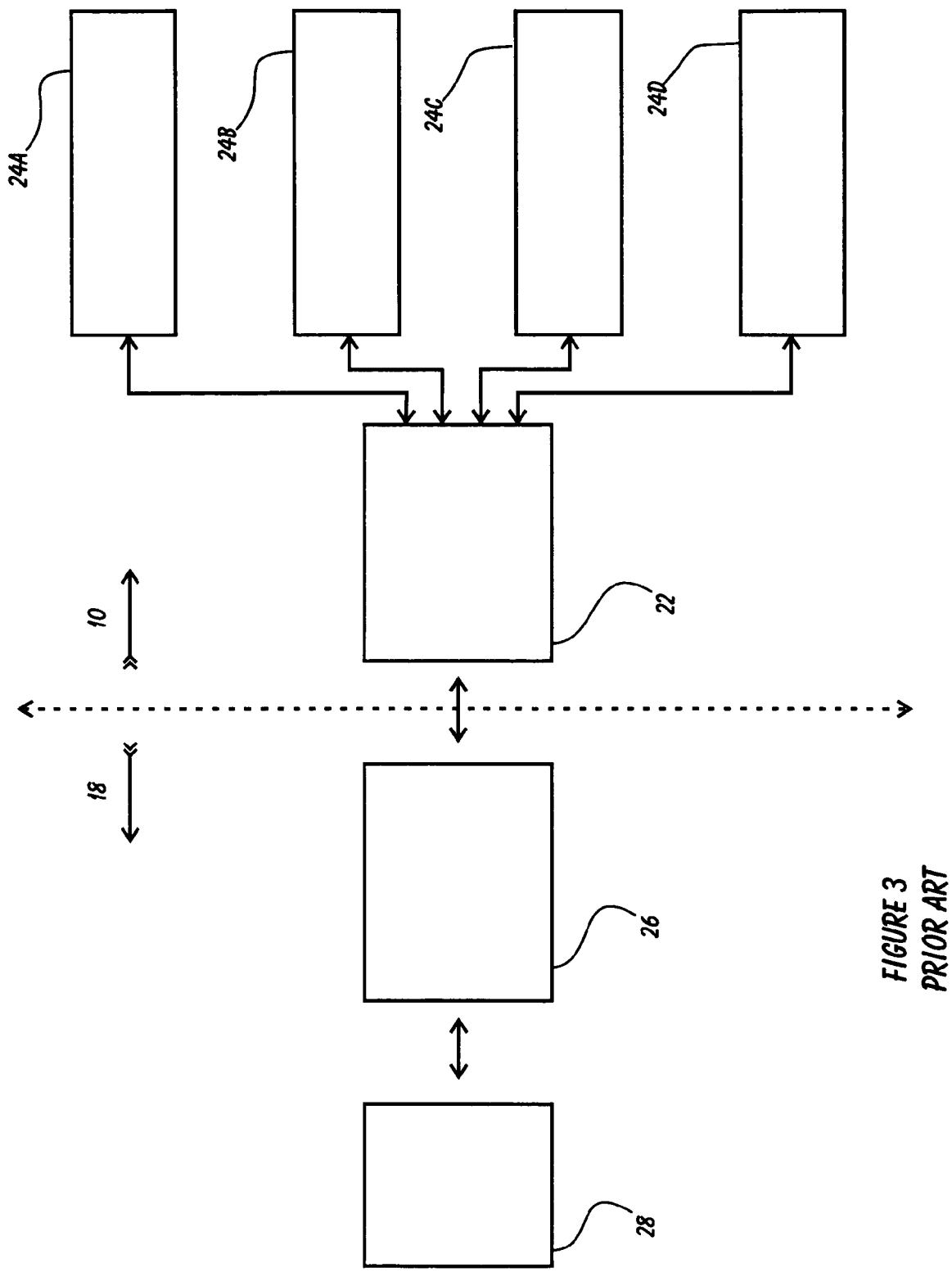
FIG. 3 depicts the functional orientation of the drive of FIGS. 1 and 2 relative to a host computing device.
Figure 4:
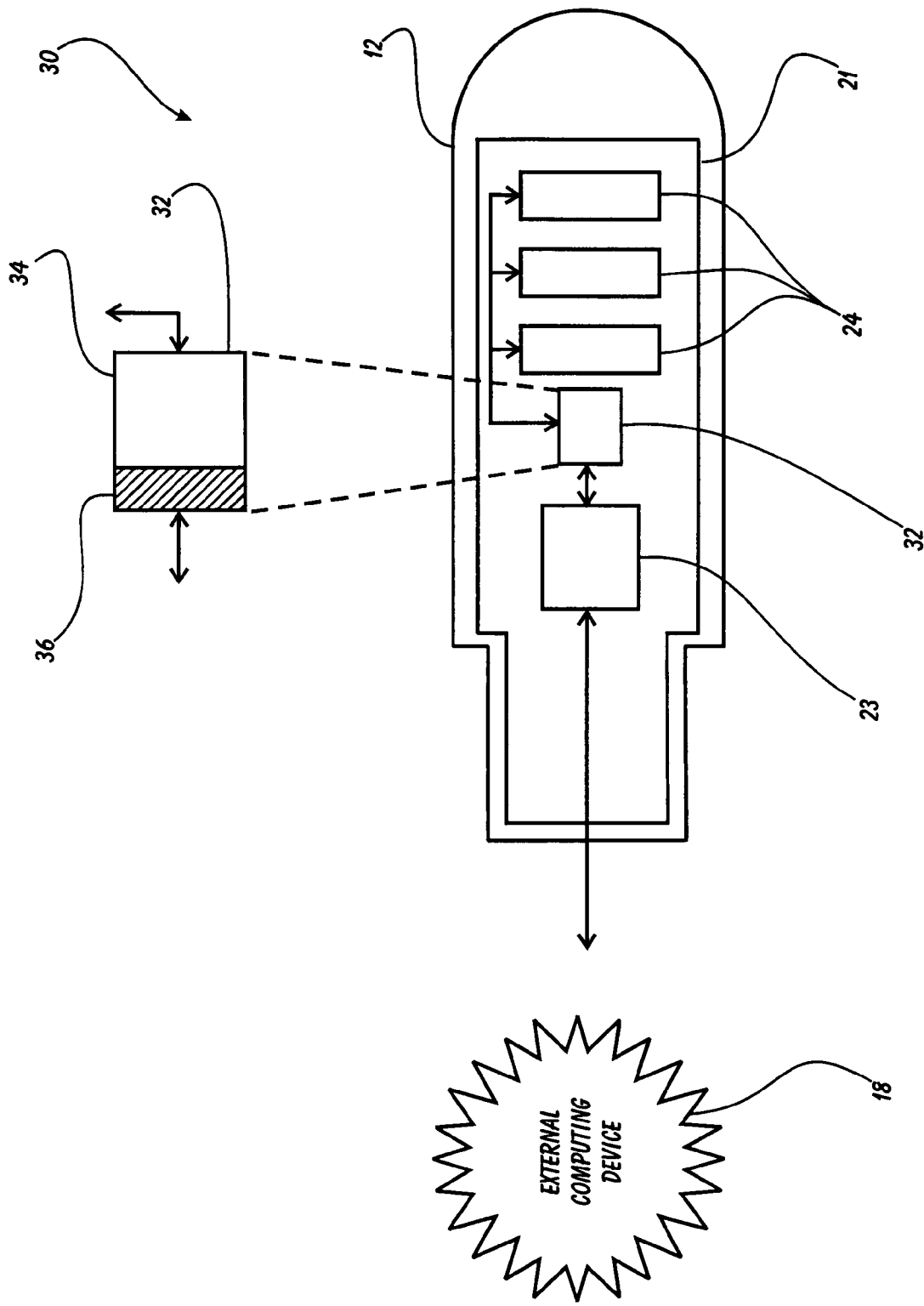
FIG. 4 is a block diagram of a conventional fingerprint-sensing USB flash drive.
Figure 5:
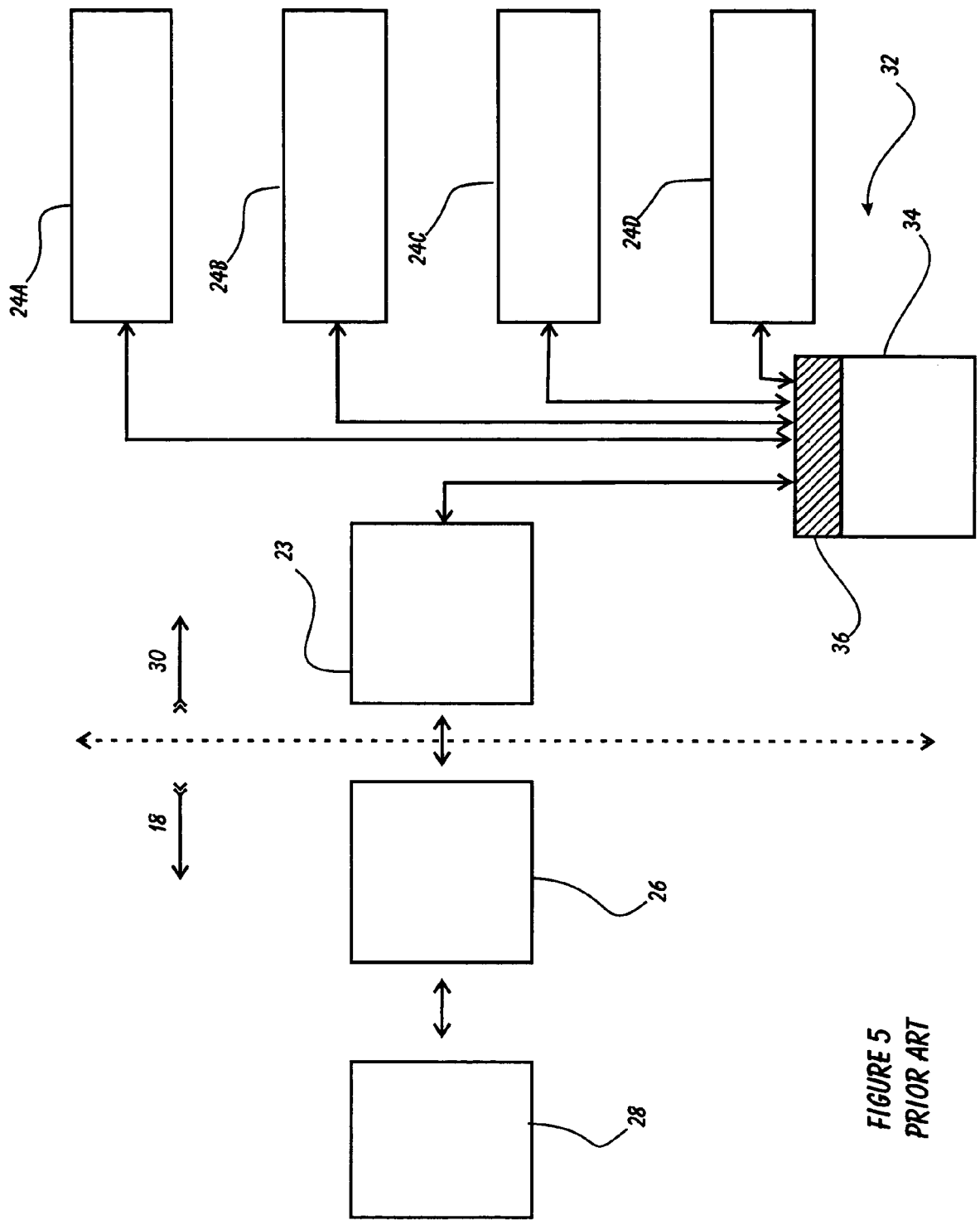
FIG. 5 depicts the functional orientation of the drive of FIG. 4 relative to a host computing device.
Figure 8:
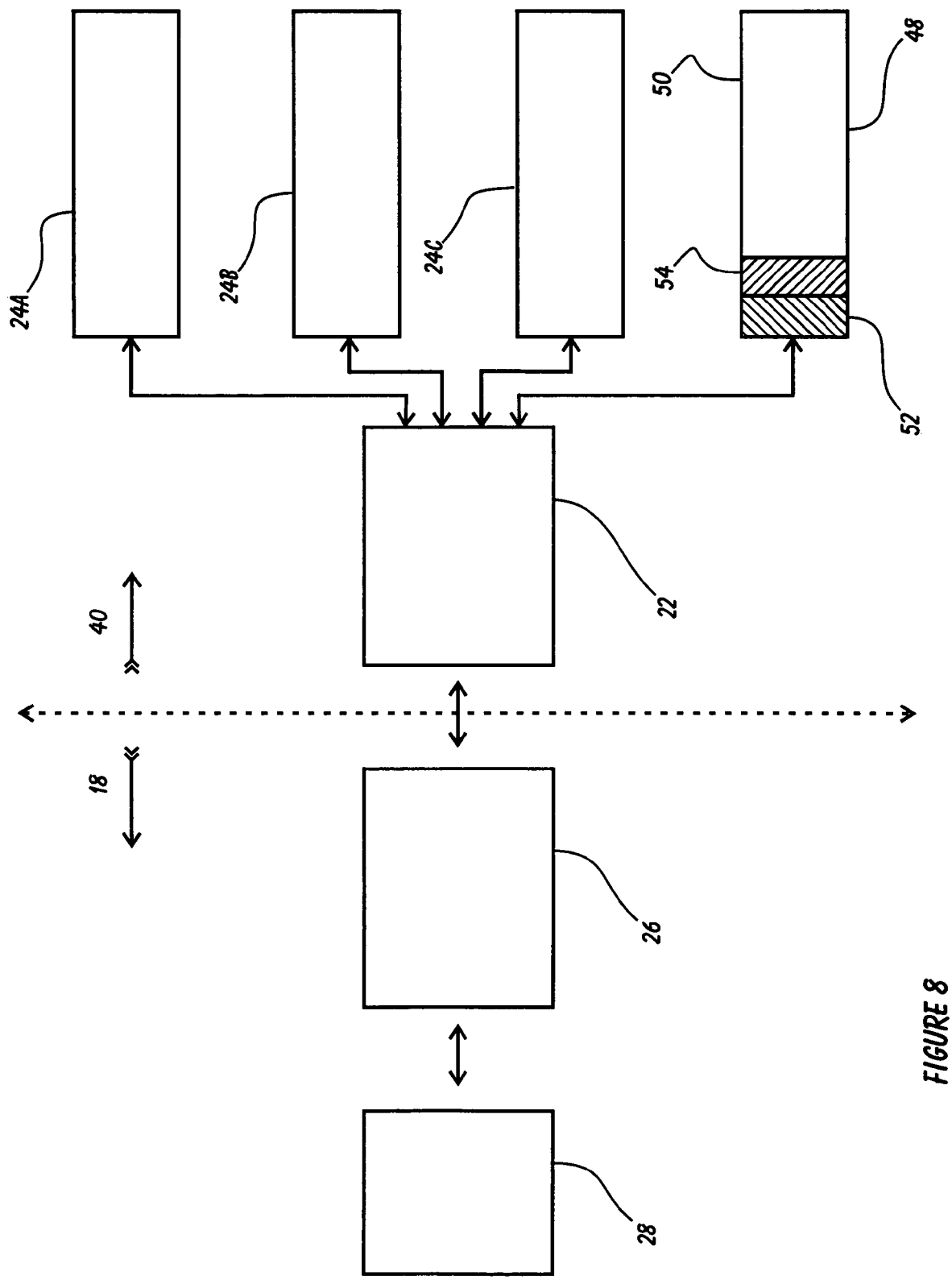
FIG. 8 depicts the functional orientation of the drive of FIGS. 6 and 7.

FIG. 7 is a block diagram of the USB drive of FIG. 6. In the Device 40, the Housing 42 contains a circuit substrate to which a plurality of flash memory devices are electrically connected. Furthermore, a Conventional Flash Interface Device 22 is also electrically connected. The difference between the conventional device of FIG. 1 and this device is that one of the Flash Memory Devices 24 has been removed and/or replaced with a Flash Fingerprint Sensor Device 50 of the present invention. The Flash Fingerprint Device 50 comprises three functional components: the Fingerprint Sensor System 48 which is configured to obtain a user's fingerprint; an Encryption Subsystem 54 which, as will be discussed further below, manipulates the received fingerprint data; and the final element being a Flash Interface Subsystem 52 which converts data transmitted or being received by the Flash Fingerprint Sensor Device 50 into a format that matches a Conventional Flash Memory Device 24. As a result, no modification is necessary for the Circuit Substrate 20 or the Flash Interface Device 22. In fact, if the fingerprint sensor features of this invention were disabled, the Drive 40 would operate just like a conventional USB flash drive. A further result of this novel approach of converting conventional architecture to provide new functionality is that extremely good cost benefits have been experienced while still providing substantial added functionality. Turning to FIG. 8, we can examine how the system operates.

FIG. 8 depicts the functional orientation of the drive of FIGS. 6 and 7. As shown here, and as discussed previously, the Flash Fingerprint Sensor Device 50 has been installed in place of an available location for a Flash Memory Device 24.

The Fingerprint Sensor System 48 communicates with an Encryption System 54, which in turn communicates through a Flash Interface Subsystem 52 with a conventional USB Flash Interface 22. As shown, each of the Flash Memory Devices 24A, 24B and 24C all communicate directly with the USB Flash Interface 22. As will be discussed further in connection with FIG. 9, the control of access to the Flash Memory Devices 24 is handled by a combination of functions executed by the USB Flash Interface 22 and a Driver Application 29 located on the External Computing Device 18. If we now turn to FIG. 9, we can discuss how such operation occurs.

Figure 9:
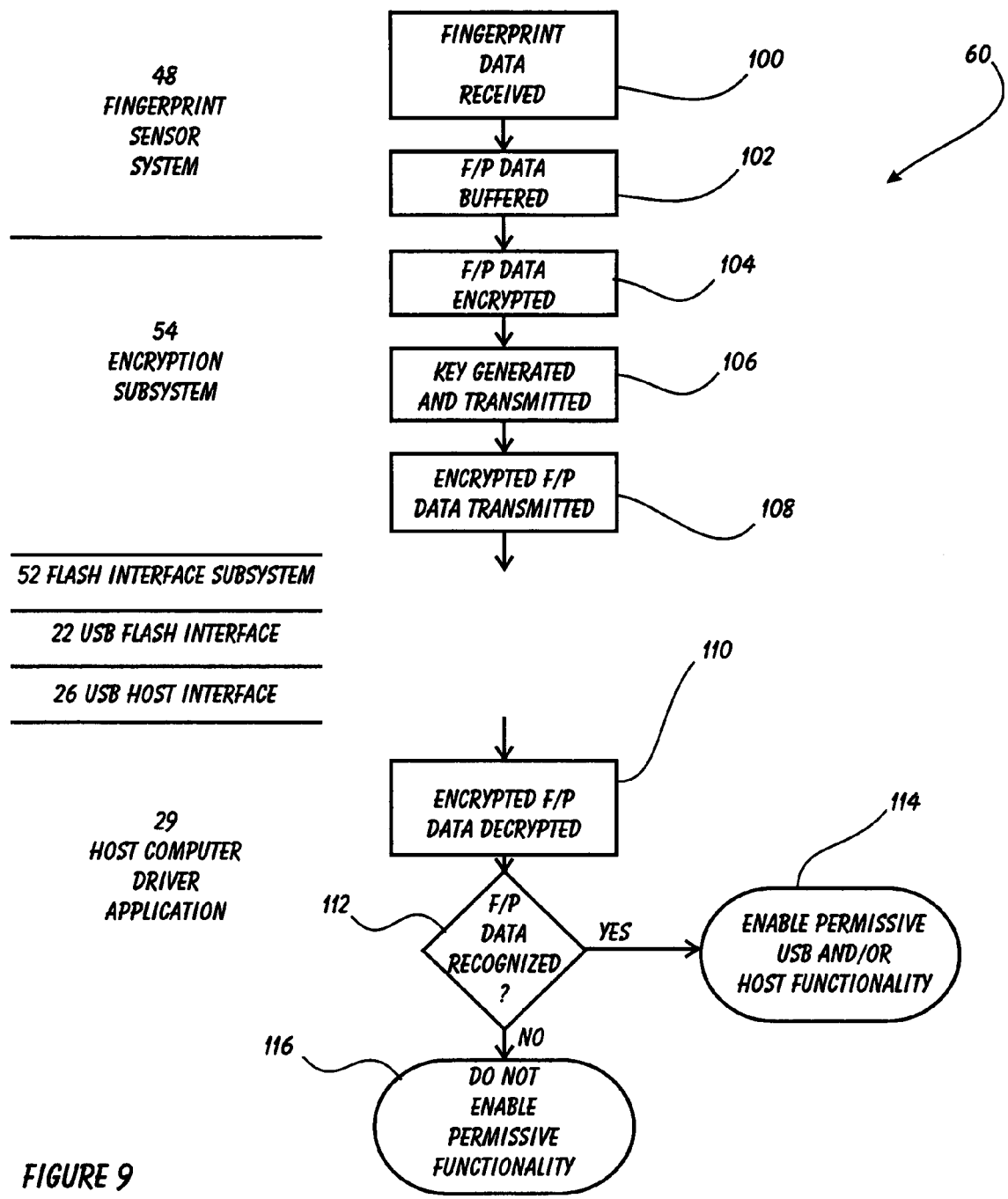
FIG. 9 is a flowchart depicting the fingerprint recognition method utilized by the flash-interfaced fingerprint sensor of the present invention.

FIG. 9 is a flowchart depicting the fingerprint recognition method utilized by the flash-interfaced fingerprint sensor of the present invention. The Flash Fingerprint Recognition Method 60 of the present invention commences when the Fingerprint Sensor System 48 receives Fingerprint Data 100. The data is received by the user scanning his or her finger or thumb into the Fingerprint Sensor 48. The received fingerprint Data is then Buffered 102 in order to provide sufficient time for the Data to be Encrypted 104 and/or scrambled. Any time Fingerprint Data is Received 100 (i.e. when data is transmitted by the Fingerprint Sensor System 48) a Key is Generated and Transmitted 106 by the Encryption Subsystem 54. Once the Key is Generated and Transmitted 106, the encrypted Fingerprint Data is then Transmitted 108. This encrypted data is transmitted via the Flash Interface Subsystem 52, the USB Flash Interface 22 and the USB Host Interface 26 until it reaches the Host Computer Driver Application 29, which is specially configured to operate cooperatively with the Encryption Subsystem 54.

The Driver Application 29 decrypts or at least attempts to Decrypt the Encrypted Fingerprint Data 110. Of course, if the application fails to decrypt the data, such as because the data has been tampered with or encrypted improperly, then the Method 60 will stop here. If the Data is decrypted, however, the application will compare the decrypted fingerprint data against the resident data for the authorized user or users. If the Fingerprint Data is Recognized 112, then the Driver Application 29 will enable permissive USB and/or Host Functionality 114. If the data is not recognized, then this permissive functionality will Not be Enabled 1 16.

An example of permissive USB functionality being enabled is that condition where normal USB flash drive access is possible; the user can save and retrieve data to and from the flash memory devices. What is unique here is that this system enables the addition of new host computer functionality as well. In fact, the system of the present invention could be configured to actually operate as a fingerprint-activated access key to the host computer. This means that the host computer would be locked until such time as the fingerprint data is recognized by the Driver Application 29. Since this device uses a standard USB interface, it is a simple Software Application 29 that provides this host computer lock functionality. Of course, both the USB permissive functionality and the host computer permissive functionality could be enabled or disabled together or after requiring separate levels of permission.

In summary, there are two significant distinctions between the Method 60 depicted here and that used by the Microprocessor-based Fingerprint Sensor Drive. Here there is unidirectional authentication. This means that the user's finger or thumbprint is authenticated without a challenge and reply process. Either the received data matches and is recognized by the database of authorized user data that is resident on the host computer, or functionality is not enabled. Since this is unidirectional, it will operate quickly and with very little user interface. A further distinction is that the host decrypts the encrypted fingerprint data. On the prior microprocessor-controlled system, all fingerprint data encryption and decryption and authorization occurred within the USB flash device itself As discussed above, this adds substantial cost to the fingerprint sensor-enabled device to the point where it becomes completely economically unfeasible.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A fingerprint sensing flash drive device, comprising:
   a housing;
   a circuit substrate contained in said housing;
   at least one flash memory device operatively bonded to said circuit substrate;
   a flash fingerprint sensor device operatively bonded to said circuit substrate;
   a flash interface device in direct electrical communication with said at least one flash memory device and said flash fingerprint sensor device, said direct electrical communication between said flash interface device and each said flash memory device being direct and separate from said direct electrical communication between said flash interface device and said flash fingerprint sensor device, and wherein communications between said flash fingerprint sensor device and said flash interface device are in conventional flash memory device format; and
   a plug extending from said housing and in communication with said flash interface device.

2. The device of claim 1, wherein said flash fingerprint sensor device is defined by fingerprint sensor system operatively residing therein.

3. The device of claim 2, wherein said flash fingerprint sensor device is further defined by an encryption subsystem operatively residing therein.

4. The device of claim 3, wherein said flash fingerprint sensor device is further defined by a flash interface subsystem operatively residing therein.

5. The device of claim 4, wherein said direct communication between said flash interface device and said flash fingerprint sensor device is operatively controlled by said flash interface subsystem.

6. The device of claim 5, wherein said housing has a sensor aperture formed therethrough; and
   said flash fingerprint sensor device is cooperatively mounted to said circuit substrate whereby said flash fingerprint sensor device is exposed through said sensor aperture.

7. A fingerprint sensing flash drive device, consisting essentially of:
   a housing;
   a circuit substrate contained in said housing;
   one or more flash memory devices operatively bonded to said circuit substrate;
   a flash fingerprint sensor device operatively bonded to said circuit substrate;
   a flash interface device in direct electrical communication with said at least one flash memory device whereby said communication between said flash interface device and each said flash memory device is direct and without involvement from said flash fingerprint sensor device, and wherein communications between said flash fingerprint sensor device and said flash interface device are in conventional flash memory device format; and
   a plug extending from said housing and in communication wit said flash interface device.

8. The device of claim 7, wherein said flash fingerprint sensor device is further defined by a flash interface subsystem operatively residing therein.

9. The device of claim 8, wherein said direct communication between said flash interface device and said flash fingerprint sensor device is operatively controlled by said flash interface subsystem.

10. The device of claim 9, wherein said flash fingerprint sensor device is further defined by fingerprint sensor system operatively residing therein.

11. The device of claim 10, wherein said flash fingerprint sensor device is further defined by an encryption subsystem operatively residing therein.

12. The device of claim 11, wherein said housing has a sensor aperture formed therethrough; and
    said flash fingerprint sensor device is cooperatively mounted to said circuit substrate whereby said flash fingerprint sensor device is exposed through said sensor aperture.

13. A portable memory device, comprising:
    a housing;
    a plug extending from said housing;
    a circuit substrate substantially encased in said housing and in electrical communication with said plug;
    a flash interface device in electrical communication with said plug through said circuit substrate;
    one or more memory devices controlled by said flash interface device, said communications for said control being in conventional flash memory format; and
    a flash fingerprint sensor device in electrical communication with said flash interface device, said flash fingerprint sensor device including a fingerprint sensor system, said communications being in conventional flash memory format.

14. The fingerprint sensing flash drive device of claim 1, wherein said communications between said flash interface device and each said flash memory device is in a flash memory device control format and further said communications between said flash interface device and said flash fingerprint sensor device are in said same flash memory device control format.

15. The fingerprint sensing flash drive device of claim 7, wherein said communications between said flash interface device and each said flash memory device is in a flash memory device control format and further said communications between said flash interface device and said flash fingerprint sensor device are in said same flash memory device control format.

* * * * *